FURNITURE ASSEMBLING DEVICE

Original Filed Feb. 19, 1962 2 Sheets-Sheet 1

Inventors:
J.S. GUILLON
C.W. SORENSEN

Fetherstonhaugh & Co.
Attorneys

FURNITURE ASSEMBLING DEVICE

Original Filed Feb. 19, 1962 2 Sheets-Sheet 2

Inventors:
J.S. GUILLON
C.W. SORENSEN

Fethestonhaugh & Co.
Attorneys

United States Patent Office

Re. 26,105
Reissued Nov. 1, 1966

26,105
FURNITURE ASSEMBLING DEVICE

Jacques Silas Guillon, Westmount, Quebec, and Christen Willner Sorensen, Montreal, Quebec, Canada, assignors, by mesne assignments, to Massey-Ferguson Industries Limited, Toronto, Ontario, Canada, a corporation of Canada Original No. 3,181,923, dated May 4, 1965, Ser. No. 174,154, Feb. 19, 1962. Application for reissue Mar. 14, 1966, Ser. No. 539,245
5 Claims. (Cl. 312—255)

Matter enclosed in heavy brackets [ ] appears in the original patent but forms no part of this reissue specification; matter printed in italics indicates the additions made by reissue.

This invention relates to the assembly of furniture, partitions etc., and particularly to the assembly of supporting legs in furniture and corner supporting posts for partitions.

The invention consists essentially of a post or leg member and a complementary assembly member for attaching to the vertical edge of partition or furniture panels to the post or leg member. The post or leg member consists of an extruded bar of circular, rectangular or other suitable cross section, having longitudinal grooves extending the full length of the bar, the grooves having opposing lips at the surface of the bar forming a relatively narrow longitudinal slot. The grooves are preferably circular in cross section, but may be of any other suitable cross section, and are set diagonally opposite each other at any suitable radial spacing, preferably at 90°. The assembly member is preferably extruded and has a longitudinal rib adapted for sliding and frictional engagement in a longitudinal direction with any one of the longitudinal grooves in the post or leg member, and is preferably slotted longitudinally to provide a spring or friction grip in the groove. The assembly member is also provided with a pair of longitudinal flanges projecting in the opposite direction from that of the longitudinal rib and are adapted to engage and be secured in prepared recesses in a funiture panel or partition without the use of bolts, screws or other like fastening members. It is preferred that one of the flanges on the assembly member be ribbed lengthwise and be secured in one of the recesses of the furniture panel or partition by any suitable bonding agent. If desired, a taper pin or other suitable like member can be driven into the end of the longitudinal rib to increase the frictional grip of the rib in the groove of the post or leg member.

In the finished assembled structure, furniture or partition, the post or leg member presents a pleasing fluted appearance while the assemly member is largely hidden from view.

The object of the invention is to provide a quick and secure method of assembly of the elements of furniture or partitions without the use of bolts screws etc.

A further object of the invention is to provide a secure engagement along the whole length of the furniture panel or partition and the supporting leg or post.

A further object of the invention is to provide a support member which can be adapted as a leg for any type of furniture or be used as an intermediate or corner post in the assembly of partitions, etc.

A further object of the invention is to provide a pair of extrusions which can be cut to length to suit various types of furniture or partitions.

A further object of the invention is to provide standard assembly legs or posts by means of which either items of furniture or partitions can be readily knocked down and reassembled in other arrangements.

These and other objects of the invention will be apparent from the following detailed description and the accompanying drawings, in which.

Figure 2:
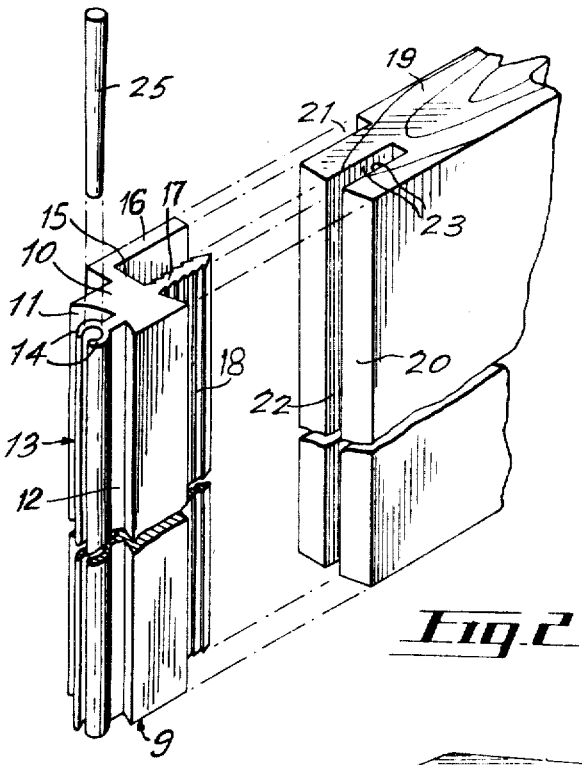
FIG. 2 is an exploded perspective view of the assembly member and the panel to which it is attached.
Figure 3:
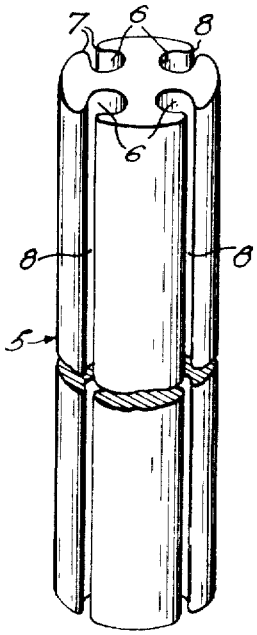
FIG. 3 is a perspective view of a post or leg member.
Figure 1:
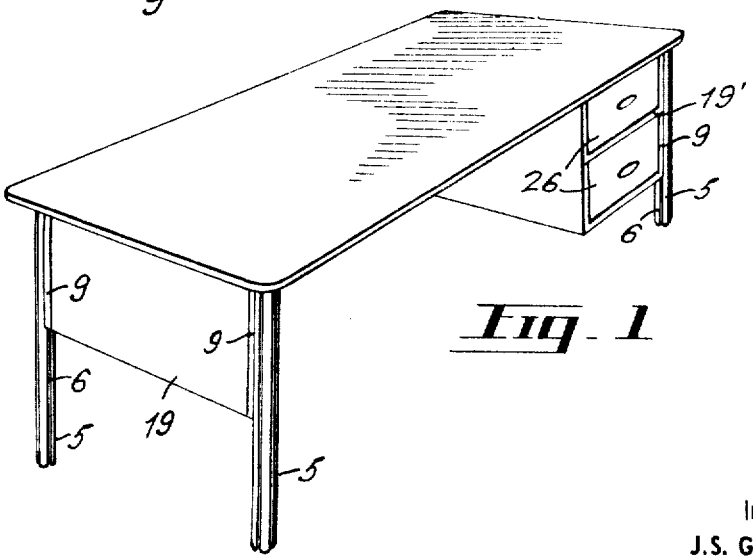
FIG. 1 is a perspective view of a typical piece of furniture assembled according to the present invention.

Referring to the drawings, the leg or post member 5, FIG. 3, is preferably extruded in the form of a circular bar having a series of longitudinal grooves 6 extending the full length of the bar. The grooves 6 are preferably circular in cross section and are provided with a pair of lips 7 forming a slot 8 of reduced width. The member 5 can be cut to any desired length suitable for the legs on a desk as shown in FIG. 1 or to form intermediate or corner posts in a partition.

The complementary assembly member 9 is also preferably extruded and has a main body portion 10. One longitudinal surface 11 of the body portion 10 is concavely rounded to the same radius as that of the leg or post member 5. A rib 12 projects outwardly from the concave surface 11 and terminates in a slotted locking rib 13 formed by the two arcuate arms 14 whose opposing outer ends are spaced slightly apart to permit a slight spring flexure of the arms 14. On the side 15 of the member 9, directly opposite from the concave surface 11, there is projected outwardly a side flange 16 and a panel gripping member 17 having longitudinal ribs 18. The side flange 16 and the panel gripping member 17 are parallel to each other in spaced apart relation and are in planes parallel with the rib 12 on the opposite side of the body portion 10.

The furniture or partition panel 19 to which the assembly member 9 is to be secured has its vertical edge 20 recessed on one surface 21 to receive the side flange 16 of member 9 and its edge is slotted at 22 to receive the panel gripping member 17. The ribs 18 of the member 17 grip the side surfaces 23 of the slot 22. However, in order to ensure a rigid bond between the member 9 and the panel 19, the slot 22 is first coated with a bonding agent 24, which when set will securely anchor the member 9 to the edge of the panel 19.

Figure 4:
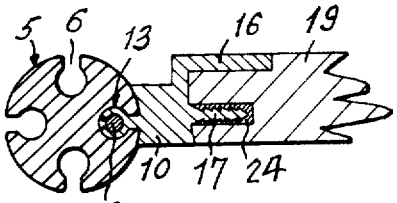
FIG. 4 is a horizontal cross section of the members in assembled condition.

The assembly of the elements is more clearly shown in FIG. 4. After the member 9 has been secured to the vertical edge of a panel or partition 19 as described above, the slotted locking rib 13 is aligned with one of the grooves 6 in the leg or post member 5 and is slid lengthwise thereof until the end of the member 9 and the top horizontal edge of the panel 19 is flush with the end of the leg or post 5. It has been found that where the members 5 and 9 are extruded from aluminum there is a natural friction grip between them so that, once they are engaged with each other, it would take considerable force for them to be displaced one along the other. This natural friction grip is further increased by the spreading tendency of the arms 14 to spread outwards to increase their friction grip on the walls of the groove 6. However, as additional insurance that the elements will stay in their intended position, a taper pin 25 is forced into the aperture formed by the top ends of the arms 14 forcing them apart still further and so locking them in the groove 6.

In FIG. 1 there is shown the invention applied to the assembly of a desk. In this application the panels 19 extend only part way down the length of the legs 5. Other means, not forming a part of this invention, are used to secure the top of the desk to the side panels. The front panel 19' can be cut out to receive the drawers 26.

Figure 5:
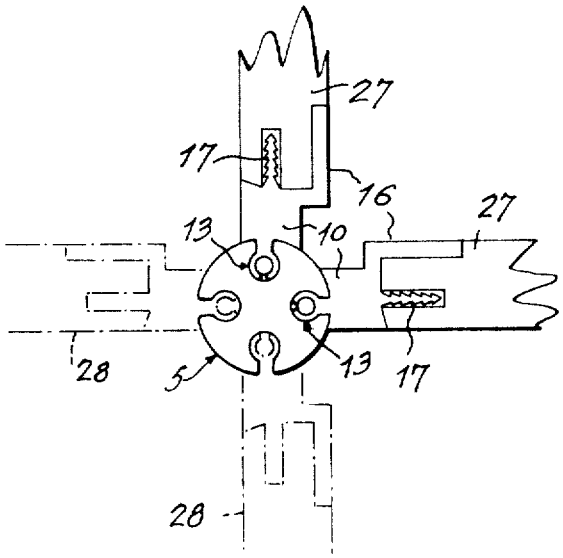
FIG. 5 is a fragmentary plan view showing a partition corner or furniture panel constructed with the components according to the invention.

In FIG. 5 there is shown an assembly in which the panels 27 could be side and back panels of the desk shown in FIG. 1 or could form a corner partition assembly. Additional panels 28 shown in chain dot lines could be used to divide a space into separate enclosures.

In the case of a partition assembly the legs or posts 5 could extend from floor to ceiling while the panels could also extend from floor to ceiling or be located at any position therebetween.

Figure 6:
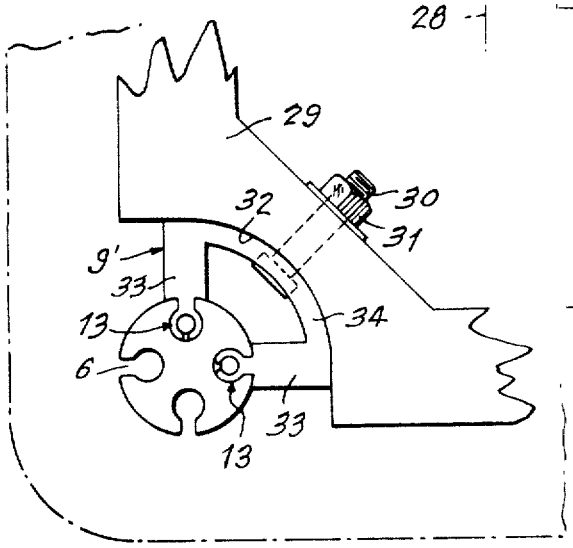
FIG. 6 is a fragmentary plan view showing a structural member assembled with a leg or post member and a modified form of assembly member.

FIG. 6 shows an arrangement in which a structural member 29 is rigidly secured to a modified form of assembly member 9' by means of the bolt 30 and nut 31. The structural member 29 has an arcuate cut-out 32 to receive the arcuate assembly member 9'. The arcuate assembly member 9' has a pair of arms 33 disposed at right angles to each other and joined together by an arcuate web 34 through which the bolt 30 is passed. Each of the arms 33 is provided with a locking rib 13 secured to a leg or post 5 in the manner above described.

Figure 7:
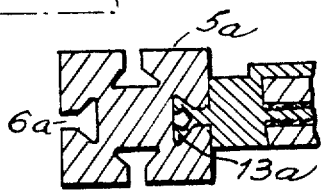
FIG. 7 is a cross section of a rectangular leg or post member having a modified form of locking rib.

Other special forms of assembly can be designed to suit particular requirements using the basic elements of the invention as described. These other forms may use leg or post members 5a of rectangular cross section as shown in FIG. 7 and have grooves 6a of other than circular section with complementary locking ribs 13a.

By using the elements of the invention in the manner described, furniture and partitions can be assembled quickly and without the use of screws or other forms of fastening to secure legs or posts to panels. The resulting jointure gives a pleasing and secure finish which is not detracted from by the grooves in the legs or posts which give a pleasing fluted appearance.

What we claim is:

1. In an article of furniture or the like, in combination, one or more cylindrical supporting leg or post members of extruded manufacture, each of the said post members having four longitudinal grooves of circular cross section located at 90 degree intervals to each other in the plane of the cross section of each leg or post member and extending the full length of the leg or post member, each of the said grooves having a restricted lip opening at the surface of the leg or post member, one or more assembly members each having a locking rib of circular cross section extending the full length of the assembly member at one edge thereof for sliding engagement in a longitudinal groove of said leg or post member, each of the said locking ribs having a longitudinal groove of generally circular cross section extending the full length thereof, the said latter groove having a restricted lip opening and forming a pair of spring members engaging with adjacent surfaces in the longitudinal groove of the said leg or post members when the said assembly member is slidably engaged therewith, and a taper pin axially aligned in one end of the longitudinal groove of the said locking rib, the said taper pin expanding the end portions of the said spring members to frictionally lock the said assembly member in a set position lengthwise of the leg or post member.

2. The combination according to claim 1, in which each assembly member has two projecting locking ribs, the free ends of the said locking ribs adapted to slidably engage in any pair of adjacent longitudinal grooves in one of said leg or post member.

3. The combination according to claim 1, in which each assembly member has a concave body portion and a pair of locking ribs projecting radially inwards from opposite longitudinal edges thereof, the free ends of said locking ribs slidably engaging in any pair of adjacent longitudinal grooves in one of said leg or post member.

*4. In an article of furniture or the like having a non-metallic panel joined to a metal post the combination of a post member having a plurality of longitudinal grooves being of cul-de-sac form in cross-section to provide a restricted lip opening at the surface of the post whereby the post presents a fluted ornamental appearance, a metal connecting member secured to the edge of the panel and to the post and having a longitudinal locking rib comprising a tenon portion fitting within the restricted lip opening and a larger beaded portion shaped to engage the walls of the cul-de-sac by endwise sliding engagement of the locking rib in a groove of the post, the connecting member further having a panel-securing portion along its entire length on the side opposite the locking rib and to which a non-metallic panel may be permanently joined and comprising at least two parallel flange-like members one of which is adapted to engage the panel along one face thereof for a substantial distance inwardly of the panel edge and the other of which is spaced from the first flange by a distance less than the panel thickness to form a tongue and groove joint with the panel, and clamping means extending within the longitudinal groove and engaging the connecting member to clamp the panel and post together against displacement.*

*5. The combination in claim 4 in which the locking rib has a bead portion formed by a pair of opposed half-beads and the clamping means is comprised of a tapered slug inserted between the half-beads to force them into tight frictional engagement with the groove.*

References Cited by the Examiner

The following references, cited by the Examiner, are of record in the patented file of this patent on the original patent.

UNITED STATES PATENTS

| | | | |
|---|---|---|---|
| 419,920 | 1/1890 | Campbell | 312—263 X |
| 517,462 | 4/1894 | Lawson. | |
| 684,663 | 10/1901 | Anawalt | 306—33 |
| 846,881 | 3/1907 | Walton. | |
| 1,080,513 | 12/1913 | Jones. | |
| 1,269,691 | 6/1918 | Dyke | 5—303 |
| 1,419,957 | 6/1922 | Cobb | 5—303 X |
| 1,954,242 | 4/1934 | Heppenstall | 312—263 X |
| 2,103,244 | 12/1937 | Briscoe. | |
| 2,636,189 | 4/1953 | Feldman | 5—93 |
| 2,715,794 | 8/1955 | Atkinson | 312—263 X |
| 2,729,386 | 1/1956 | Haddad | 217—65 X |
| 2,734,789 | 2/1956 | Wilson | 312—140.3 X |
| 2,797,447 | 7/1957 | Winer. | |
| 2,871,077 | 1/1959 | Mutchnik | 311—310 |
| 3,007,213 | 11/1961 | Hobbs | 20—74 |

FOREIGN PATENTS

| | | |
|---|---|---|
| Ad. 21,180 | 4/1920 | France. |
| 1,187,160 | 3/1959 | France. |
| 17,872 | 1900 | Great Britain. |
| 598,827 | 9/1946 | Great Britain. |
| 913,888 | 12/1962 | Great Britain. |

CLAUDE A. LE ROY, *Primary Examiner.*

A. FRANKEL, *Assistant Examiner.*